United States Patent [19]
Oertley

[11] Patent Number: 5,333,710
[45] Date of Patent: Aug. 2, 1994

[54] UNDERCARRIAGE FOR TRACK-TYPE MACHINE

[75] Inventor: Thomas E. Oertley, Dunlap, Ill.
[73] Assignee: Caterpillar Inc., Peoria, Ill.
[21] Appl. No.: 157,765
[22] Filed: Nov. 24, 1993
[51] Int. Cl.⁵ .............................................. B62D 55/00
[52] U.S. Cl. .................................... 180/9.5; 180/9.1; 180/9.52; 180/9.6
[58] Field of Search .................... 180/9.5, 9.1, 9.52, 180/9.6

[56] References Cited
U.S. PATENT DOCUMENTS
5,279,377 1/1994 Oertley ............................... 180/9.5

Primary Examiner—Mitchell J. Hill
Attorney, Agent, or Firm—Claude F. White

[57] ABSTRACT

An undercarriage structure for a track-type machine having a main frame includes first and second track roller frame assemblies, one positioned on each side of the main frame, and connected to the main frame by one or more pivot shafts. The first and second roller frames are positioned at an angle relative to the main frame in a vertically oriented plane to produce a substantially negative camber angle at zero vertical load on the roller frames. The camber angle cycles between negative and positive during loading of the roller frames within the working range of the machine. This results in the rails of the endless track contacting the track rollers in different areas and prolongs the wear life of the endless track.

13 Claims, 4 Drawing Sheets

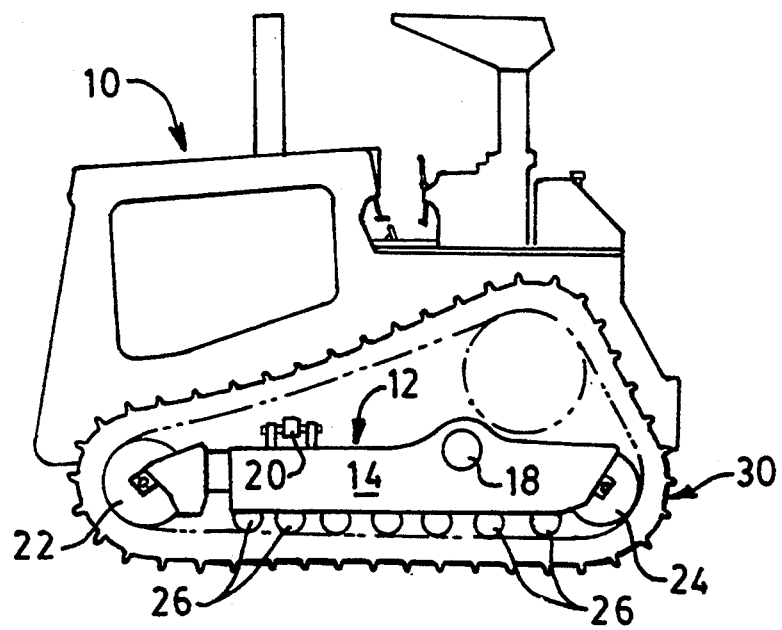
Fig_1_
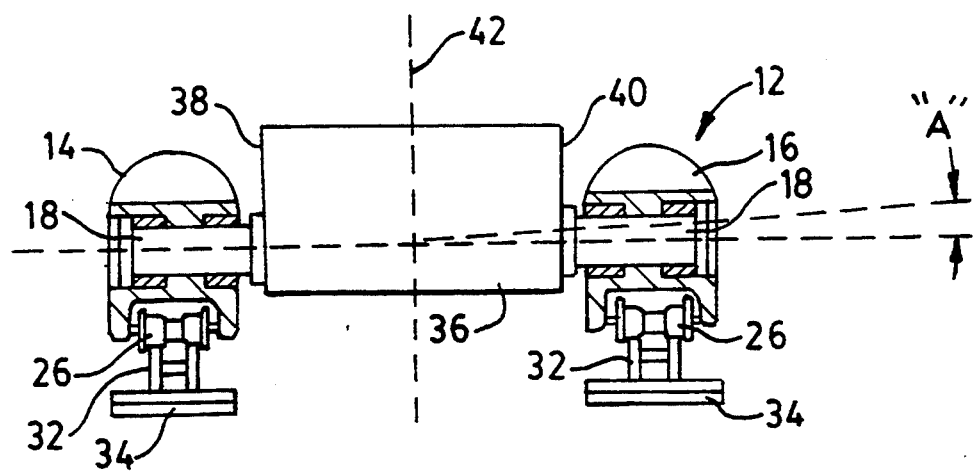
Fig_2_

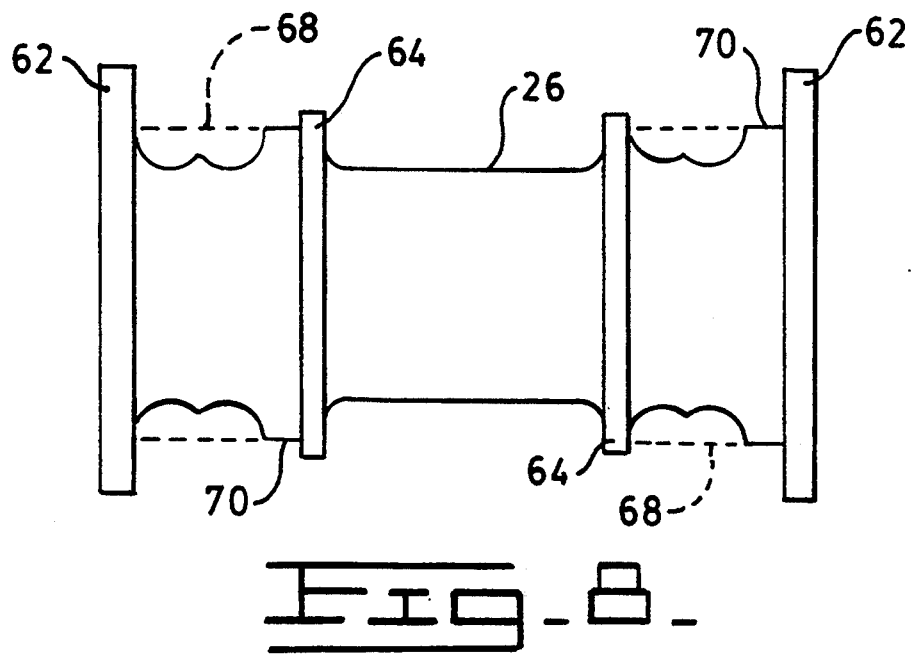
Fig_8_
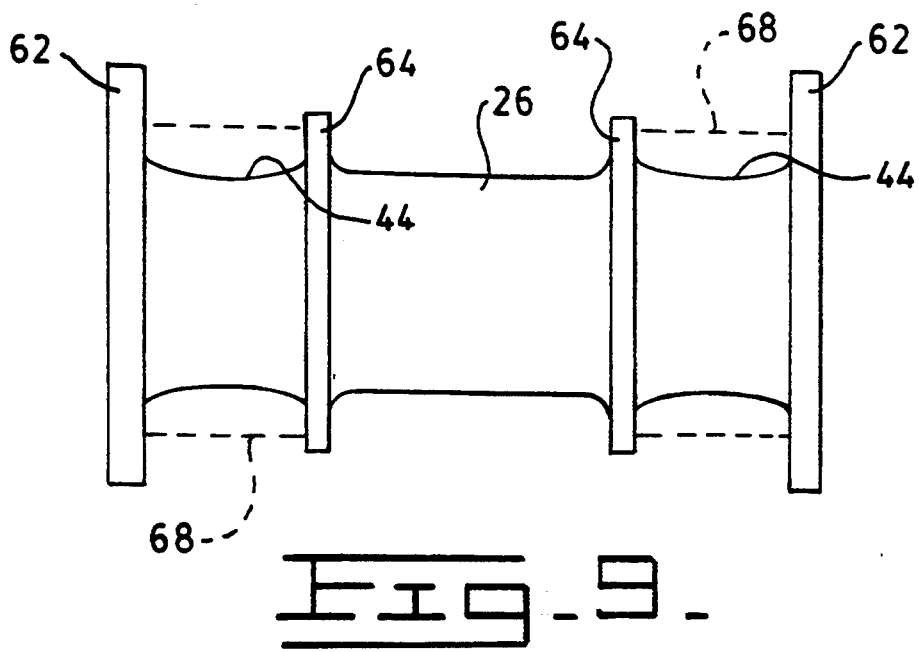
Fig_9_

— 5,333,710 —

UNDERCARRIAGE FOR TRACK-TYPE MACHINE

DESCRIPTION

1. Technical Field

This invention relates generally to an undercarriage structure for a track-type machine and more particularly to an improved undercarriage structure which increases the useful wear life of certain undercarriage components.

2. Background Art

Current and prior designs of undercarriage structures for track-type machines use design and manufacturing practices which generally require that the individual left and right track assemblies be substantially parallel to a vertical centerline of the machine mainframe. Such parallelism produces a camber angle of zero degrees. The camber angle is defined as the angle between an axis perpendicular to the machine vertical centerline and the axial centerline of each pivot shaft which connects the track assemblies to the machine main frame. In reality, however, deflection of the pivot shafts due to loads on the track rollers produces a small positive camber angle. Depending upon the stiffness of the pivot shafts, related structures, and working conditions, the positive camber angle can possibly vary between zero and two degrees. Because of this small positive camber angle, the track is biased toward the outside of the machine and the track rails have a tendency to always run to one side of the guide rollers and against the outside guiding flange of the rollers. This results in the contacting surfaces of the rails and rollers assuming wear profiles which substantially match each other. This also results in less than 100 percent utilization of the available wear surfaces of the rails and rollers.

The present invention is directed to overcoming one or more of the problems as set forth above.

DISCLOSURE OF THE INVENTION

In one aspect of the invention, an undercarriage structure for a track-type machine having a main frame includes first and second roller frame assemblies spaced along each side of the main frame, first and second pivot shafts connecting respective first and second pivot shafts to the main frame, and means for positioning the roller frame assemblies at an angle to the main frame in a vertically oriented plane.

Rapid wear of the moving undercarriage components of self-laying track-type machines is a major concern of owners and operators of such machines. Various type of improvements have been proposed and attempted in order to extend the wear life of the moving undercarriage components. These include guards and shields, various type of replaceable roller treads, and the use of hard materials imbedded in the roller treads and link surfaces. Although some of these fixes have had limited success, most have not proved feasible or economical.

The subject invention provides an undercarriage structure which prolongs the wear life of certain moving components. This is accomplished by ensuring that the mating wear surfaces of the moving components have more than a single wear path during operation of the machine and undercarriage structure

BRIEF DESCRIPTION OF THE DRAWINGS

FIG. 1 is a diagrammatic side elevational view of a track type machine incorporating the subject invention;

FIG. 2 is a diagrammatic rear elevational view of a main frame and connected track roller frames of a prior art track-type machine;

FIG. 8 is a diagrammatic plan view of a track roller showing a wear pattern of a prior art undercarriage structure; and FIG. 9 is a diagrammatic plan view of a track roller showing a wear pattern of an undercarriage structure incorporating the subject invention.

BEST MODE FOR CARRYING OUT THE INVENTION

Figure 3:
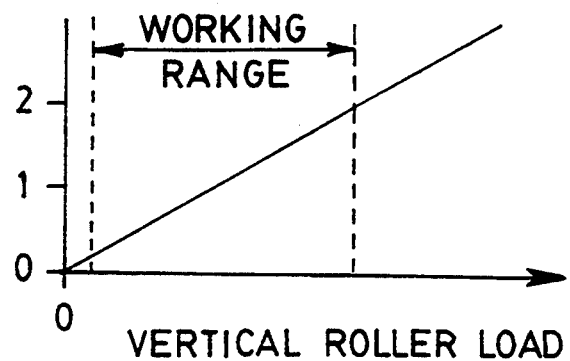
FIG. 3 is a graphic chart illustrating the positive camber angle of a prior art track-type machine.

Referring to the drawings, a track type machine 10 has an undercarriage structure 12, including first and second spaced apart track roller frame assemblies 14,16, one or more pivot shafts 18, and an equalizer bar 20. Each of the first and second roller frame assemblies 14,16 includes first and second idler wheels 22,24 and a plurality of guide rollers 26. A drive sprocket wheel 28 is positioned on each side of the machine 10 and is powered in forward and reverse directions by the vehicle 10. An endless track chain assembly 30 encircles each drive sprocket 28, the first and second idler wheels 22,24, and the guide rollers 26. The track chain assembly 30 includes a plurality of interconnected track links 32 and a plurality of track shoes 34 secured to the track links 32. The guide rollers 26 guide the track links 32 as the track chain assembly 30 is driven by the drive sprocket 28.

The machine 10 includes a main frame 36 having first and second sides 38,40 and a vertically oriented centerline 42. The first and second track roller frame assemblies 12,14 are spaced from and adjacent respective first and second sides 38,40 of the main frame 36. The pivot shafts 18 pivotally connect the track roller frame assemblies 14,16 to the respective first and second sides of the main frame 36. As shown in FIG. 2, most current and prior designs of undercarriage structures are constructed to provide a camber angle "A" of zero degrees. However, deflection of the pivot shafts 18 due to loads on the track rollers 36 produces a small positive camber angle "A" of about 0.1 to 2 degrees. This positive camber angle "A" is illustrated by the graphic chart of FIG. 3. Such a positive camber angle "A" causes the track assembly 30 to be biased toward the outside of the machine 10, and the track rails 32 will run to one side of the guide rollers 26. This produces a wear pattern on the treads 44 of the guide rollers 26 similar to that shown in FIG. 8.

Figure 4:
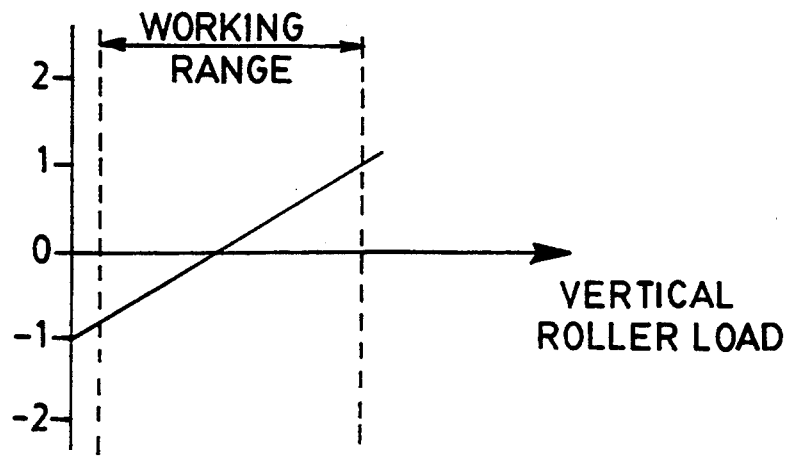
FIG. 4 is a graphic chart illustrating the negative camber angle of the present invention.
Figure 5:
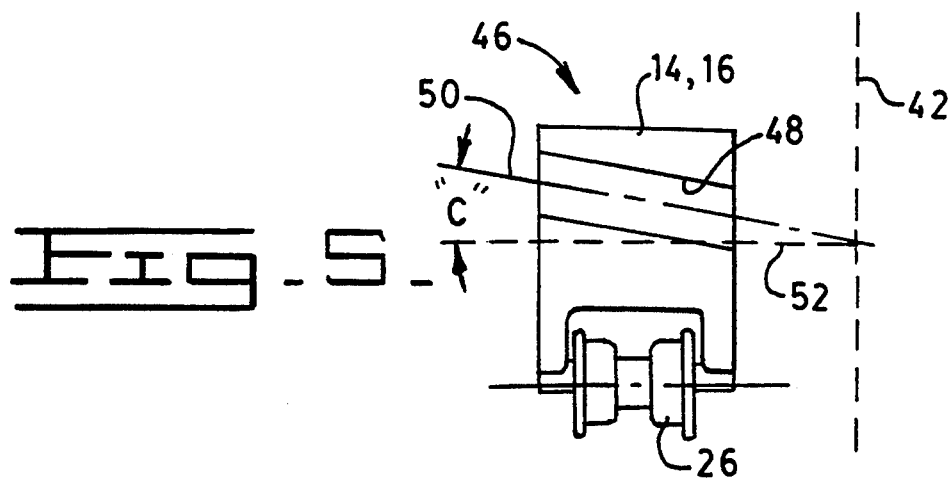
FIG. 5 is a diagrammatic rear view of a track roller frame incorporating the subject invention.

The subject undercarriage structure includes means 46 for positioning the first and second roller frame assemblies 14,16 at an angle relative to the vertical centerline 42 of the main frame 36 in a vertically oriented plane. This produces an initial small negative camber angle "B", as is illustrated by the graphic chart of FIG. 4. One type of positioning means 46 is shown in FIG. 5 and includes a bore 48 in each of the roller frame assemblies 14,16, with each bore 48 having an axial centerline 50. The centerline 50 is non-perpendicular to the vertical centerline 42 of the main frame 36 and forms an acute angle "C" with an imaginary horizontal axis 52 which is perpendicular to the vertical centerline 42. The acute angle "C" can vary in the range of 0.05 to 2.0 degrees, but is preferably in the range of 0.05 to 1.0 degrees.

Figure 6:
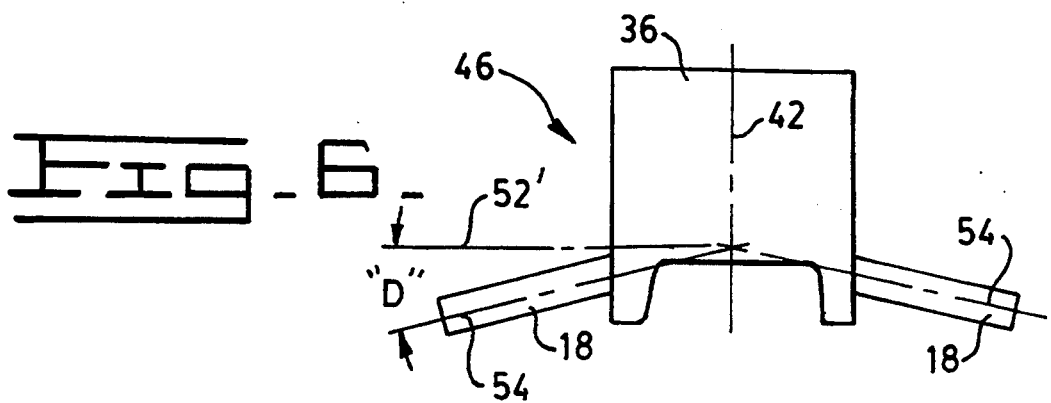
FIG. 6 is a diagrammatic rear view of a machine main frame and pivot shafts incorporating the subject invention.

Another type of positioning means 46 is shown in FIG. 6 and includes each pivot shaft 18 having an axial centerline 54 and a planar mounting surface 56. The mounting surfaces 56 are nonperpendicular to the axial centerlines 54, and the mounting surfaces 56 are adapted to be mounted directly to the main frame 36. The axial centerline 54 forms an acute angle "D" with an imaginary horizontal axis 52' which is perpendicular to the vertical centerline 42. The acute angle "D" can vary in the range of 0.05 to 2.0 degrees, but is preferably in the range of 0.05 to 1.0 degrees.

Figure 7:
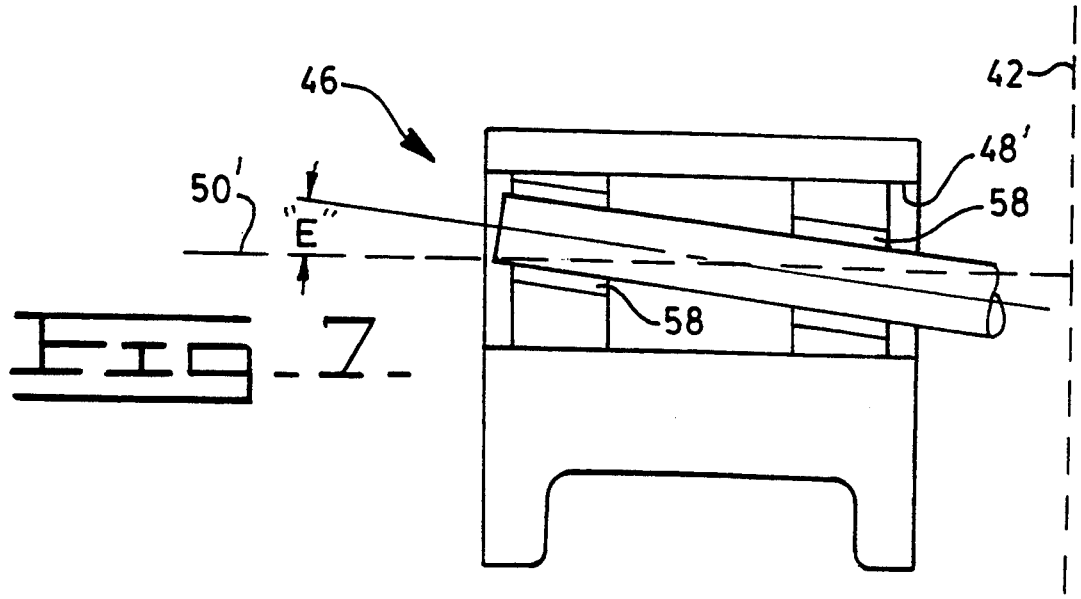
FIG. 7 is a diagrammatic rear view, partly in section, of a track roller frame and pivot shaft incorporating the subject invention.

Another type of positioning means 46 is shown in FIG. 7 and includes a bore 48' in each roller frame assembly 14,16 for receiving respective pivot shafts 18. Each bore 48' has an axial centerline 50' which is substantially perpendicular to the vertical centerline 42 of the main frame 36. One or more bearing assemblies 58 are mounted within each bore 48'. The bearing assemblies have an axial centerline 60 which is non-parallel to the axial centerlines 50' of the roller frame bores 48'. The non-parallelism between the axial centerline 60 of the bearing assemblies 58 and the axial centerline 50' of the roller frame bores 48' can vary in the range of 0.05 to 2.0 degrees, but is preferably within the range of 0.05 to 1.0 degrees. The non-parallelism between the axial centerline 50' and the axial centerline 60 forms an acute angle "E".

In each of the positioning means 46 shown in the drawings and described above, the roller frames 14,16 are positioned initially with respect to the main frame 36 at a negative camber angle. As the machine 10 is operated within its working range, the camber angle alternates between a negative angle and a positive angle. Approximately one-half of the working time, the camber angle is negative and the other one-half of the working time the camber angle is positive. With particular reference to FIG. 9, the subject invention will result in the track links 32 being thrust against an outer flange 62 of the guide rollers 26 approximately 50% of the operating time and against an inner flange 64 of the guide rollers 26 the remaining 50T of the operating time. This will produce a desirable wear pattern on the tread surface 44 of the guide rollers 26 in which substantially the full width of the tread surface 44 is utilized. The original unworn surfaces of the rollers 26 in FIGS. 8 and 9 are shown by dotted lines 68. As shown in FIG. 8, a portion 70 of the original surfaces 68, in the prior art undercarriages, is never utilized.

Industrial Applicability

With reference to the drawings and the previous detailed description, the subject undercarriage structure 12 is particularly useful for increasing the wear life of certain undercarriage components. With the roller frame assemblies 14,16 positioned with respect to the main frame 36 to produce an initial negative camber angle, the track link 32 will run on the tread surface 66 adjacent the outer flanges 62. As the machine 10 operates, the camber angle will change from negative to positive and the links 32 will run on the tread surface 66 adjacent the inner flanges 64. The links 32 run back and forth between the outer and inner flanges 62,64 as the camber angle changes from negative to positive. This utilizes the entire width of the roller tread surfaces 66 and increases the useful wear life of the undercarriage components.

Other aspects, objects, and advantages of this invention can be obtained from a study of the drawings, the disclosure, and the appended claims.

I claim:

1. An undercarriage structure for a tracktype machine having a main frame with said main frame having first and second sides and a vertically oriented centerline when said machine is viewed in a vertically oriented plane, said structure comprising:
   a first roller frame assembly spaced from and positioned adjacent a first side of said main frame;
   a second roller frame assembly spaced from and positioned adjacent a second side of said main frame;
   a first pivot shaft pivotally connecting said first roller frame assembly to said first side of said main frame;
   a second pivot shaft pivotally connecting said second roller frame assembly to said second side of said main frame; and
   means for positioning said first and second roller frame assemblies at an angle relative to said centerline of said main frame in said vertically oriented plane.

2. An undercarriage structure, as set forth in claim 1, wherein said means for positioning includes a bore in each roller frame assembly, said bore having an axial centerline which is non-perpendicular to said vertical centerline of said main frame and forms an acute angle with an imaginary horizontal axis which is perpendicular to said vertical centerline.

3. An undercarriage structure, as set forth in claim 1, wherein each of said pivot shafts has an axial centerline and a planar mounting surface which is non-perpendicular to said axial centerline and said means for positioning includes connecting said mounting surfaces directly to said main frame.

4. An undercarriage structure, as set forth in claim 1, wherein said means for positioning includes a bore in each roller frame assembly for receiving respective pivot shafts, each bore having an axial centerline which is substantially perpendicular to said vertical centerline, a bearing assembly mounted within each bore, and said bearing assemblies having an axial centerline which is non-parallel to the axial centerlines of said roller frame bores.

5. An undercarriage structure, as set forth in claim 2, wherein said acute angle is in the range of 0.05 to 2.0 degrees.

6. An undercarriage structure, as set forth in claim 3, wherein said axial centerline forms an acute angle with an imaginary horizontal axis which is perpendicular to said vertical centerline and wherein said angle is in the range of 0.05 to 2.0 degrees.

7. An undercarriage structure, as set forth in claim 4, wherein said non-parallelism of said bearings' axial centerline to said roller frame bores' axial centerline is in the range of 0.05 to 2.0 degrees.

8. A track-type machine having a main frame having first and second sides and a vertically oriented centerline when said machine is viewed in a vertically oriented plane, first and second track roller frame assemblies spaced from and adjacent respective first and second sides of said main frame, and a pivot shaft connecting each of said track roller frame assemblies to said main frame, the improvement comprising:

means for positioning said first and second roller frame assemblies at an angle to said centerline of said main frame in vertically oriented plane.

9. A machine, as set forth in claim 8, wherein said means for positioning includes a bore in each roller frame assembly, said bore having an axial centerline which is non-perpendicular to said vertical centerline of said main frame and forms an acute angle with an imaginary horizontal axis which is perpendicular to said vertical centerline, said acute angle being in the range of 0.05 to 2.0 degrees.

10. A machine, as set forth in claim 8, wherein each of said pivot shafts has an axial centerline and a planar mounting surface which is non-perpendicular to said axial centerline and said means for positioning includes connecting said mounting surfaces directly to said main frame.

11. A machine, as set forth in claim 10, wherein said axial centerline forms an acute angle with an imaginary horizontal axis which is perpendicular to said vertical centerline, and wherein said acute angle is in the range of 0.05 to 2.0 degrees.

12. A machine, as set forth in claim 8, wherein said means for positioning includes a bore in each roller frame assembly for receiving said respective pivot shafts, each bore having an axial centerline which is substantially perpendicular to said vertical centerline, a bearing assembly mounted within each bore, and each bearing having an axial eenterline which is non-parallel to a respective axial centerline of the roller frame bore.

13. A machine, as set forth in claim 12, wherein said non-parallelism is in the range of 0.05 to 2.0 degrees.

* * * * *